United States Patent
Jalasutram et al.

(10) Patent No.: US 10,732,000 B2
(45) Date of Patent: Aug. 4, 2020

(54) PROMOTING USER COMPLIANCE WITH ADAPTIVE CHECKPOINTS

(71) Applicant: Uber Technologies, Inc., San Francisco, CA (US)

(72) Inventors: Srikanth Jalasutram, San Francisco, CA (US); Guillaume Lachaud, San Francisco, CA (US); Varun Krishna Rau, San Francisco, CA (US); Abhay Vardhan, Redwood City, CA (US)

(73) Assignee: Uber Technologies, Inc., San Francisco, CA (US)

( * ) Notice: Subject to any disclaimer, the term of this patent is extended or adjusted under 35 U.S.C. 154(b) by 175 days.

(21) Appl. No.: 15/702,734

(22) Filed: Sep. 12, 2017

(65) Prior Publication Data

US 2019/0078901 A1 Mar. 14, 2019

(51) Int. Cl.
*G01C 21/34* (2006.01)
*G06N 5/02* (2006.01)
*G01C 21/36* (2006.01)
*G06N 20/00* (2019.01)

(52) U.S. Cl.
CPC ....... *G01C 21/343* (2013.01); *G01C 21/3415* (2013.01); *G01C 21/3438* (2013.01); *G01C 21/3617* (2013.01); *G01C 21/3697* (2013.01); *G06N 5/025* (2013.01); *G06N 20/00* (2019.01); *G01C 21/3676* (2013.01)

(58) Field of Classification Search
CPC .............. G01C 21/3415; G01C 21/343; G01C 21/3438; G01C 21/3617; G01C 21/3676; G01C 21/3697
See application file for complete search history.

(56) References Cited

U.S. PATENT DOCUMENTS

| | | | | |
|---|---|---|---|---|
| 8,718,926 | B1 * | 5/2014 | Denise | G01C 21/3415 340/990 |
| 10,126,138 | B1 * | 11/2018 | Farmer | G01C 21/3438 |
| 2009/0234577 | A1 * | 9/2009 | Rinscheid | G01C 21/3415 701/533 |
| 2011/0224893 | A1 * | 9/2011 | Scofield | G01C 21/3492 701/119 |
| 2011/0313652 | A1 * | 12/2011 | Hancock | B60L 3/12 701/527 |
| 2015/0142518 | A1 * | 5/2015 | Farinha Gomes Felix | G06Q 30/0202 705/7.31 |

(Continued)

*Primary Examiner* — Redhwan K Mawari

(74) *Attorney, Agent, or Firm* — Fenwick & West LLP

(57) ABSTRACT

A system determines a route for a user and creates checkpoints along the route to encourage the user to follow the suggested route. For example, a ride sharing system may encourage users with vehicles to move toward regions where rides are in highest demand by offering a route to that region with checkpoints along the way. A user may receive a reward upon reaching a checkpoint. The system may adapt checkpoints to user types. Models are trained to output rule sets for placing checkpoints along a route and assigning values to the checkpoints. In some embodiments, the models are trained according to categories of users, so that the checkpoints can be placed in a way that will encourage the user to comply with a route. When a user strays from a suggested route, the system generates an updated set of checkpoints to encourage the user to return to the route.

17 Claims, 6 Drawing Sheets

(56) References Cited

U.S. PATENT DOCUMENTS

| | | | |
|---|---|---|---|
| 2015/0161554 A1* | 6/2015 | Sweeney | G06Q 10/063114 |
| | | | 705/7.15 |
| 2016/0247247 A1* | 8/2016 | Scicluna | G06Q 10/02 |
| 2017/0135621 A1* | 5/2017 | Lee | A61B 5/18 |
| 2017/0193614 A1* | 7/2017 | Kalyanaraman | G06Q 50/14 |
| 2017/0255966 A1* | 9/2017 | Khoury | G08G 1/0129 |
| 2017/0328728 A1* | 11/2017 | Salowitz | G01C 21/36 |
| 2018/0047288 A1* | 2/2018 | Cordell | B60Q 9/008 |
| 2018/0189669 A1* | 7/2018 | Jeon | G06Q 10/047 |
| 2019/0078901 A1* | 3/2019 | Jalasutram | G01C 21/343 |

* cited by examiner

PROMOTING USER COMPLIANCE WITH ADAPTIVE CHECKPOINTS

BACKGROUND

Field of Art

This disclosure relates generally to determining checkpoints along a route, and in particular to using computer models to determine a sequence of checkpoints with which a particular user is likely to comply.

Description of Art

Computerized systems can find user-specified addresses on a map, and provide routes between multiple addresses. Mapping and routing can have various applications, such as helping groups of people coordinate travel or services, and directing drivers of vehicles to locations the drivers may be unfamiliar with. Travel coordination systems provide a means of travel by connecting users who need rides (e.g., "riders") with users who can drive them (e.g., "providers"). A rider can submit a trip request to a system at which point the system may select a provider to service the request by transporting the rider to an intended destination.

It can be difficult for providers to anticipate locations where they are most needed. For example, a provider offering ride-sharing services may not know where to go to find riders, or may not be motivated to move a long distance to find a rider. An existing approach for incentivizing provider movement toward areas of high demand is presenting the user with a map showing areas where provider services are needed. However, providers may choose not to expend time and effort required to move toward those high-demand areas, and may choose instead to wait in place until service requests come to them.

SUMMARY

A system promotes provider movement toward areas of higher demand by establishing checkpoints along a route to an area of high demand. The system determines a region in which providers are in high demand and generates a route from a provider's current location to the region. The system then generates a set of checkpoints along the route. The provider may be rewarded for staying on the suggested route by earning rewards when a checkpoint is passed. Rewards may be motivational, educational, monetary, celebratory, or otherwise designed to encourage the provider to continue along the route. If a provider strays from the suggested route, the system can adapt to the change and regenerate a route with different checkpoints to encourage the provider to return to the route or to otherwise continue toward the destination.

The system trains a set of models to output rule sets for determining locations and values of checkpoints along routes. Each model may correspond to a different categorized type of provider, such as whether the provider is a member of a group of affiliated drivers or is unaffiliated, and whether the provider is experienced or unexperienced. Thus one model may correspond to experienced providers who are members of an affiliated group (e.g., an affiliated group may coordinate schedules or may coordinate who provides certain services). Each model receives a set of features describing the route and information about the provider, such as trip histories, earnings goals, provider ratings, and usual hours of operation, and outputs checkpoints or rule sets that can be applied to routes to place checkpoints in positions that are motivational to the individual providers. The system may monitor the progress of a provider travelling along a route. Checkpoints are adaptive in that, when a provider strays from the suggested route, the system may generate a new set of checkpoints to lead the provider back to the suggested route, or along a newly generated route that leads to the destination. Thus, checkpoints may be adapted to a specific provider type and may be updated in response to deviations from a suggested route.

The models are trained using map data and data about past trips. Some examples of training data include records associated with past providers, rule sets that were applied to routes suggested to the providers, and information about provider compliance when presented with checkpoints along suggested routes. For instance, a model may be trained to select a rule set from a plurality of rule sets by determining, based on past trip data, a likelihood that a provider will comply with checkpoints generated by different rule sets. Existing models may by updated periodically, or when new data is obtained.

The features and advantages described in this summary and the following detailed description are not all-inclusive. Many additional features and advantages will be apparent to one of ordinary skill in the art in view of the drawings, specification, and claims hereof.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

To motivate a provider to move toward a region where providers are in high demand, a system generates checkpoints for the provider along a suggested route that leads to the region. A checkpoint is a location or region that a provider can visit or pass through to receive a reward (e.g., financial, motivational, or educational compensation). A reward may be displayed to a provider in the form of graphics, audio, or video messages sent to a user device. The system uses models to determine locations and values for checkpoints along a route. In some embodiments, the models produce rule sets that can be applied to a given route to establish checkpoints.

The models allow the system to tailor rules for checkpoint creation to individual providers or types of providers. The models may use provider profile information, past trip information, map data, and information about current conditions to determine a rule set that will place checkpoints along a route to encourage a particular provider to comply with a suggested route. Motivating providers to move toward areas of high demand in this way is beneficial because it can increase a provider's willingness to operate in different regions, and because, when implemented for many providers at once, the method allows the system to balance inequalities between supply and demand of providers in different areas of a map.

Figure 1:
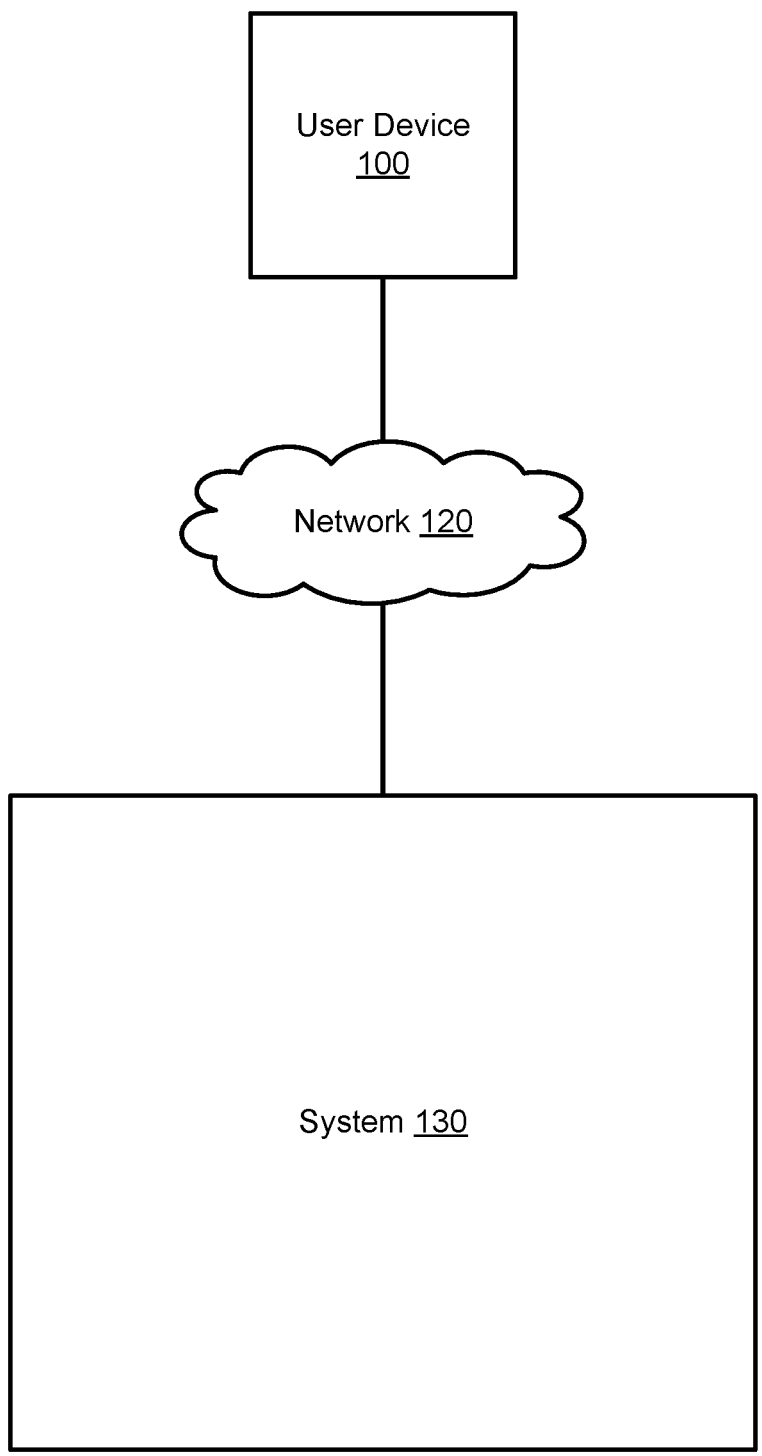
FIG. 1 is a high-level block diagram of an environment for a system, in accordance with some embodiments.

FIG. 1 is a high-level block diagram of a system environment for a system 130, in accordance with some embodiments. FIG. 1 includes a user device 100, a network 120, and the system 130. For clarity, only one user device 100 is shown in FIG. 1. Alternate embodiments of the system environment can have any number of user devices 100 as well as multiple systems 130. The functions performed by the various entities of FIG. 1 may vary in different embodiments. The system 130 may provide routing, direction, and timing information to the user device 100. In some embodiments, the system 130 may coordinate travel, for example, by matching a rider with a provider who can transport the rider, items, or services to a destination requested by a rider.

In some embodiments, the system 130 may determine a set of checkpoints along a route leading from a provider's current location to a destination, such as a geographical area where providers are in higher demand (e.g., an area where many users have submitted requests for transport or transportation services). The system 130 uses models, such as machine learned models, to determine a positioning of the checkpoints along a route with which a provider is mostly likely to comply. For example, current travel conditions and characteristics specific to a provider or a category of providers may be provided as input to a model that outputs rules to apply to a route to determine a set of checkpoints along the route.

Providers and riders may interact with the system 130 through user devices 100. User devices 100 can be personal or mobile computing devices, such as smartphones, tablets, or notebook computers. In some embodiments, the user device 100 executes a client application that uses an application programming interface (API) to communicate with the system 130 through the network 120. A current location of a user device 100 may be designated by a user or detected using a location sensor of the user device 100 (e.g., a global positioning system (GPS) receiver).

User devices 100 may interact with the system 130 through client applications configured to interact with the system 130. The client applications of the user devices 100 can present information received from the system 130 on a user interface, such as a map of the geographic region, the current location of the user device 100, estimated trip duration, locations of checkpoints, and/or a number of checkpoints reached by the provider. The client application on the user device 100 may be able to determine the current location and provide the current location to the system 130.

The user devices 100 can communicate with the system 130 via the network 120, which may comprise any combination of local area and wide area networks employing wired or wireless communication links. In some embodiments, all or some of the communication on the network 120 may be encrypted.

Figure 2:
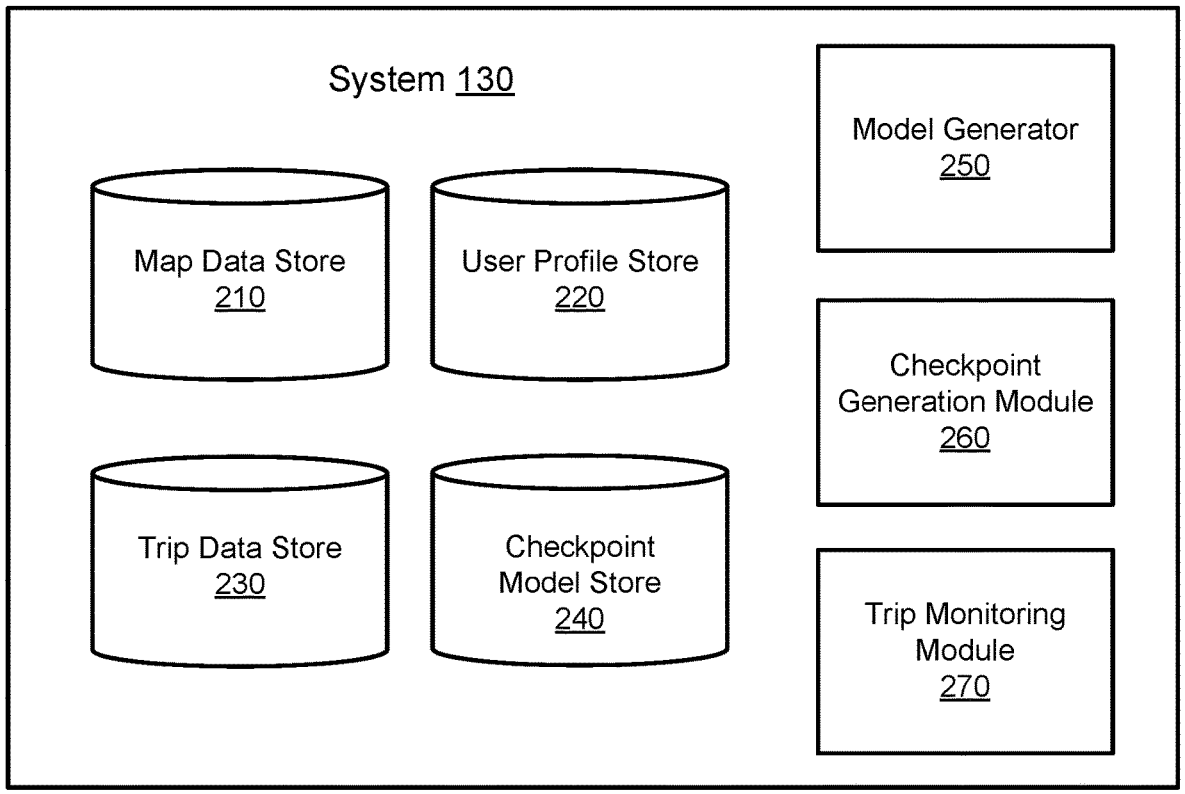
FIG. 2 is a block diagram of an architecture for the system, in accordance with some embodiments.

FIG. 2 is a block diagram of a system architecture for the system 130, in accordance with some embodiments. The system 130 includes various modules and data stores to determine routes and/or estimate trip durations. The system 130 comprises a map data store 210, a user profile store 220, a trip data store 230, a checkpoint model store 240, a model generator 250, a checkpoint generation module 260, and a trip monitoring module 270. Computer components such as web servers, network interfaces, security functions, load balancers, failover servers, management and network operations consoles, and the like are not shown so as to not obscure the details of the system architecture. Additionally, the system 130 may contain more, fewer, or different components than those shown in FIG. 2 and the functionality of the components as described herein may be distributed differently from the description herein.

The map data store 210 stores maps of geographic regions in which the system 130 generates routes, offers trip coordination services, and the like. The maps contain information about roads within the geographic regions. For the purposes of this disclosure, roads can include any route between two places that allows travel by foot, motor vehicle, bicycle or another form of travel. Examples of roads include streets, highways, freeways, trails, bridges, tunnels, toll roads, waterways, airways, or crossings. Roads may be restricted to certain users, or may be available for public use. Roads can connect to other roads at intersections. An intersection is a section of one or more roads that allows a user to travel from one road to another. Roads may be divided into road segments, where road segments are portions of roads that are uninterrupted by intersections with other roads. For example, a road segment would extend between two adjacent intersections on a surface street or between two adjacent entrances/exits on a highway.

The map data store 220 also includes map features, which may be stored in association with regions, road segments, and routes. Map features can include road features that describe characteristics of a map, such as placement of road signs, speed limits, road directionality (e.g., one-way, two-way), traffic history, traffic conditions, addresses on a road segment, lengths of road segments, and road segment type (e.g., surface street, residential, highway, toll). The map properties can also include features associated with intersections, such as road sign placement, the presence of traffic signals, turn restrictions, light timing information, throughput, and connecting road segments. In some embodiments, the map features also include properties describing the geographic region as a whole or portions of the geographic region, such as weather within the geographic region, geopolitical boundaries (e.g., city limits, county borders, state borders, country borders), and topological properties.

In some embodiments, the map data store 220 stores information about virtual delineations of regions (e.g., geofences). A geofence is a virtual perimeter geographically enclosing a portion of map data. Geofences are used to delineate specific geographic regions and may be applied for various reasons, such as categorization or alerts. In one embodiment, a large region is subdivided into many smaller regions using geofences, and data about map features is collected with respect to effects or presence within individual geofences. Geofences may be established along political boundaries (e.g., city borders), census tracts, neighborhood outlines, using arbitrary grid cells (e.g., an overlay of hexagons on a map), or as a group of grid cells selected based on one or more characteristics of the region corresponding to the cells.

The user profile store 220 stores information about users of the system 130 such as providers and riders. The information about users stored in the user profile store 220 may be anonymized. The user profile store 220 may store data and statistics about past trips a provider has taken, provider goals, and provider tendencies. For example, the user profile store 220 may include how long a provider has been providing trips for the system 130, provider ratings, data about past trips a provider has facilitated, an average number of trips provided per hour, vehicle type, usual hours of providing service, an average arrival time in relation to a predicted estimated time of arrival, whether the provider typically follows suggested routes, a weekly earnings goal the provider has set, geographical regions most frequently visited by the provider, an average amount of time the provider is willing to wait for a new assignment, and so forth. Provider data stored in the user profile store 220 may be used to categorize a provider by providing indications that the provider is a member of a group of similar providers (e.g., an inexperienced provider belonging to an affiliated group of providers). In some embodiments, the user profile store 220 includes a user feature indicating explicitly that a provider is a member of a particular provider category (rather than inferring the provider category from other user data).

Data about providers may be collected by the system 130, for example, via provider interactions with applications on a user device 100, and via rider feedback about the provider. User profile data may be used to determine a provider's probability of behaving in certain ways, for example, whether a provider is likely to follow a suggested route, checkpoint spacing that the provider will comply with, and whether a provider is likely to travel among different geographical regions, for example, when responding to a trip request from a rider. Such likelihoods may be predicted by a computer model when selecting rules for checkpoints.

The trip data store 230 stores data related to one or more past trips facilitated by the system 130. Trip data may include information about one or more of an origin and a destination of a trip, a route taken between the origin and the destination, a time of the trip, and an identification of the trip provider. Stored trip information can also include route features such as traffic signals and road signs, an estimated trip duration generated at the time a trip was requested, and an actual trip duration. In some embodiments, the trip data store 230 stores data related to trips taken by a provider that were not requested by a rider and that did not involve rider transport. For example, the system may suggest routes to a provider to encourage the provider to move toward an area of high demand (e.g., an area where many riders are requesting trips). In some embodiments, the system 130 may include checkpoints along a route to motivate the provider to follow the suggested route. The trip data store 230 stores information about provider compliance, such as checkpoints reached by the provider, routes suggested to the provider, a length of time taken by the provider to follow the route, times at which checkpoints were reached, and so forth.

The checkpoint model store 240 stores models that the system 130 uses to generate checkpoints. In some embodiments, a model outputs a set of rules that may be applied to a route to determine checkpoint locations along the route. The models stored in the checkpoint model store 240 may be machine learned models, statistical models, or rule-based models. The models receive as input information from one or more of the map data store 210, the user profile store 220, and the trip data store 230. In some embodiments, different models are stored for different categories of providers. As an example, provider categories may be determined by whether a provider is a member of a group of affiliated providers or is unaffiliated, and whether the provider is inexperienced, or experienced. Thus, one model may be trained to generate checkpoints for providers who are inexperienced and unaffiliated, and another model may be trained to generate checkpoints for providers who are inexperienced and affiliated with a group of providers, etc. In some embodiments, the checkpoint model store 240 stores models for individual providers, rather than for categories of providers.

The checkpoint model store 240 may additionally store rule sets that specify rules that may be applied to routes to determine locations and values of checkpoints. A rule set may include instructions about how to space checkpoints spatially and temporally along a route (e.g., estimated distance or duration of time between two checkpoints). In some embodiments, the checkpoint model store 240 may store individual rules (rather than predefined sets of rules) and the models may be trained to combine the rules into optimal rule sets for a provider category. For example, a checkpoint model may combine a rule for spacing checkpoints equidistantly along a route and another rule for determining a number of checkpoints that should be created for a provider. This example would result in a determined number of checkpoints equally spaced along a route. Such models are trained to select an optimal combination of rules.

The model generator 250 generates the checkpoint models that are stored in the checkpoint model store 240. The model generator 250 uses information from the map data store 210, the user profile store 220, and the trip data store 230 to generate models for determining checkpoints along a route. In one embodiment, training data used by the model generator 250 to train the models includes records of past providers, regions with high rates of trip requests, rule sets that were applied to routes that were suggested to the providers, and information about provider compliance, for example, whether or not the providers followed the suggested routes and passed the checkpoints. The models determine rules for placing checkpoints along a route such that a given provider is most likely to comply with the suggested route by following the checkpoints. In one embodiment, a model may be trained to select a rule set by determining a provider's likelihood of complying with checkpoints generated by different rule sets, and selecting a rule set for which the provider has a high likelihood of compliance. Stated another way, each rule set is scored by the model and a highest scoring rule set may be selected. The model generator 250 may update existing models periodically, or when new data is obtained.

The checkpoint generation module 260 generates routes and applies models from the checkpoint model store 240 to the routes to determine locations of checkpoints along the route. The checkpoint generation module 260 determines a location or region on a map to which a provider should move. For example, a certain area of the map may have many riders submitting trip requests to the system 130, but may have a dearth of providers available to facilitate the requests, so the checkpoint generation module 260 may determine that more providers are needed in that area.

To generate a set of checkpoints for a provider, the checkpoint generation module 260 generates a route from the provider's current location to the location or region to which the checkpoint generation module 260 has determined the provider should move. A route may be a path along a series of road segments that connects an origin location (such as the provider's current location) with a destination location. The checkpoint generation module 260 may optimize a route between an origin and a destination in a variety of ways. For example, a particular route may be selected for its short distance, lack of left turns, avoidance of toll roads, short estimated duration, etc. The checkpoint generation module 260 uses map data stored in the map data store 220 to generate a route. In some embodiments, the routing module 230 additionally uses past user data stored in the trip data store 230 to generate a route.

In some embodiments, the checkpoint generation module 260 determines a category to which a provider belongs and accordingly selects an appropriate model from the checkpoint model store 240. The provider category may be determined using a rule-based system to match the provider to a model stored in the checkpoint model store 240. For example, the models in the checkpoint model store 240 may be generated such that they apply to new providers, providers who have provided more than one hundred trips, providers who have provided more than two hundred trips, etc. Other categorization rules may be used in other embodiments. The checkpoint generation module 260 determines which of the categories a given provider belongs to, using information about the provider from the user profile store 220.

The checkpoint generation module 260 applies a selected model to input data about the provider and data about current travel conditions to generate a set of rules for placing checkpoints along a route, and for assigning a value to each checkpoint. Input values may include data about the provider from the user profile store 220, map data from the map data store 210, data about past trips from the trip data store 230, and information obtained from the provider (e.g., an earnings goal for a day, preferred hours of operation, etc.). The model outputs a set of rules that can be applied to a route to determine the placement and value of checkpoints along the route. In some embodiments, such rule sets may rely on information such as distance or estimated trip duration data to determine checkpoint locations. As one example, checkpoints may be placed along a route at equally spaced increments of distance, or along a route at equally spaced increments of estimated travel time. In some embodiments, checkpoints may not be equally spaced, but may be spaced at increments that are determined to be effective for providers in a provider category associated with a model that determines the rule set. In some embodiments, checkpoint sizes may additionally be defined by the rule sets. For example, a checkpoint may be defined in different ways including as an address, or as area within a geofence. In some embodiments, routes and checkpoints along a route may be selected based on a number of riders requesting trips along the route or near the checkpoints.

The checkpoint generation module 260 applies the rule set to the generated route. The application of the rule set results in a set of checkpoints and values associated with the checkpoints (e.g., financial compensation, motivational messages, etc.). The checkpoint generation module 260 may provide information about the route and the checkpoints to the user device 100 for display to the provider.

The trip monitoring module 270 receives data about trips as trips occur (recall that a trip may include a provider's movement independent of transporting a rider). Trip data may include information about an origin location and destination, traffic conditions, whether the provider follows the suggested route, whether checkpoints are reached, how long it takes a provider to travel between checkpoints, and feedback and incident reports submitted by riders or providers. Trip data collected by the trip monitoring module 270 is stored in the trip data store 230. In some embodiments, the trip monitoring module 270 may alert the system 130 when a provider strays from the suggested route during a trip. In such cases, the checkpoint generation module 260 may regenerate a set of checkpoints from the provider's current location to encourage the provider to return to the suggested route, or the checkpoint generation module 260 may generate a new route and associated checkpoints leading from the provider's current position to the destination location.

Figure 3:
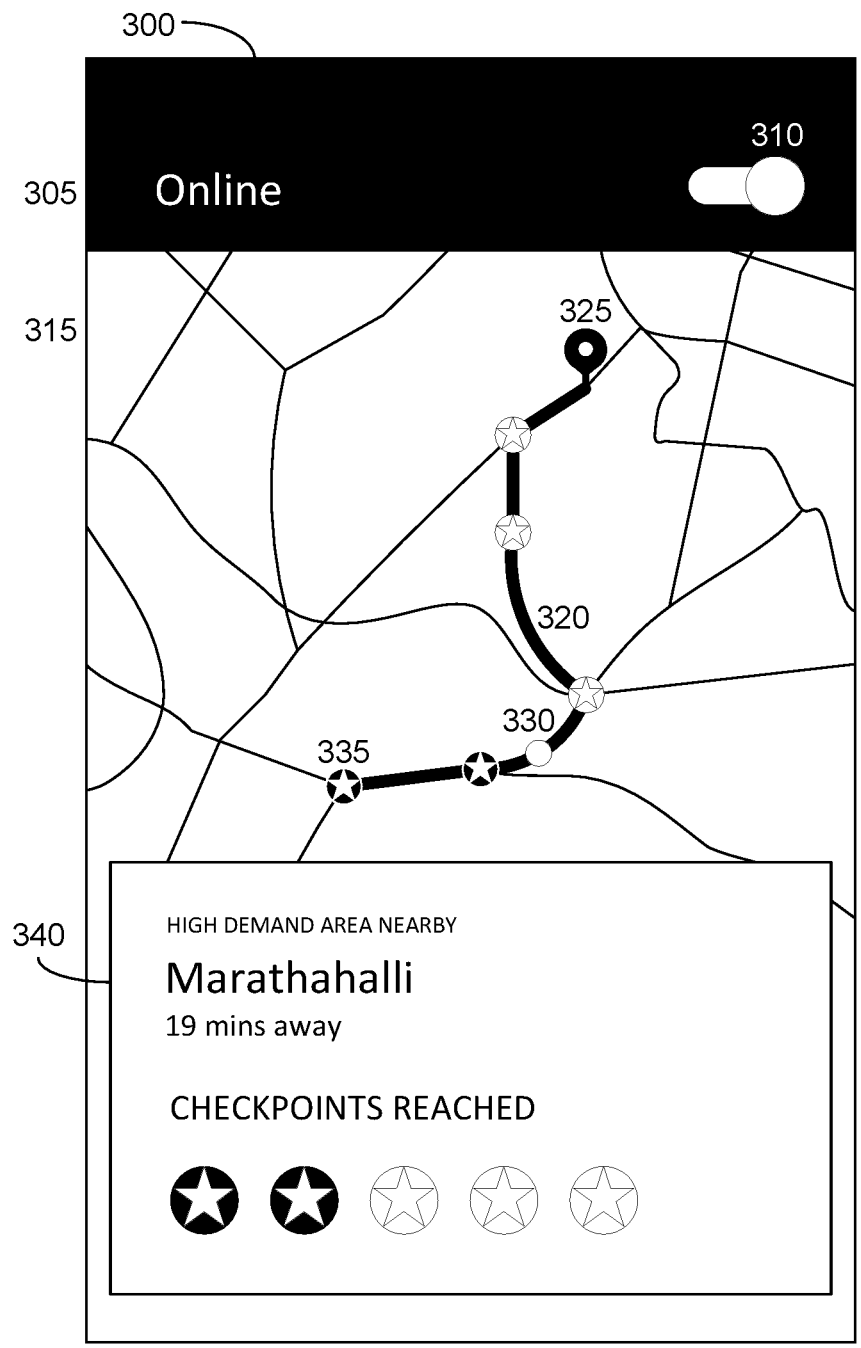
FIG. 3 illustrates an example user interface for displaying a route with checkpoints, and tracking a user's progress along the route.

FIG. 3 illustrates an example user interface for displaying a route with checkpoints and tracking a user's progress along the route, in accordance with an example embodiment. The example includes a user interface 300, such as may be displayed on a screen of a user device 100. The user interface 300 includes a provider status 305 and a user interaction element 310 (e.g., a software toggle or button) indicating whether the provider is online (e.g., currently accepting trip requests), and allowing the provider to switch between online and offline states. The user interface 300 further includes a map 315 and an information box 340. The map 315 in the example of FIG. 3 shows a route 320 suggested by the system 130 to the provider to move the provider toward a destination 325. The destination 325 may be, for example, located in a region where many riders are submitting trip requests. The route 320 shown on the map 315 may include a user position marker 330, indicating a current location of the provider. The map 315 further includes checkpoint markers 335 positioned along the route 320. The checkpoint markers 335 indicate locations or regions where the checkpoint generation module placed checkpoints at which a provider may earn rewards. In some embodiments, the user interface 300 may alter checkpoint markers 335 when a checkpoint has been reached, for example by changing the color of the checkpoint marker 335 or by removing the checkpoint marker 335 from the route 320. The information box 340 may include information about a destination address or region, and an estimated time of arrival. In some embodiments, the information box 340 may also include information about checkpoints that the provider has passed and rewards or compensation that the provider has earned by passing the checkpoints.

Figure 4:
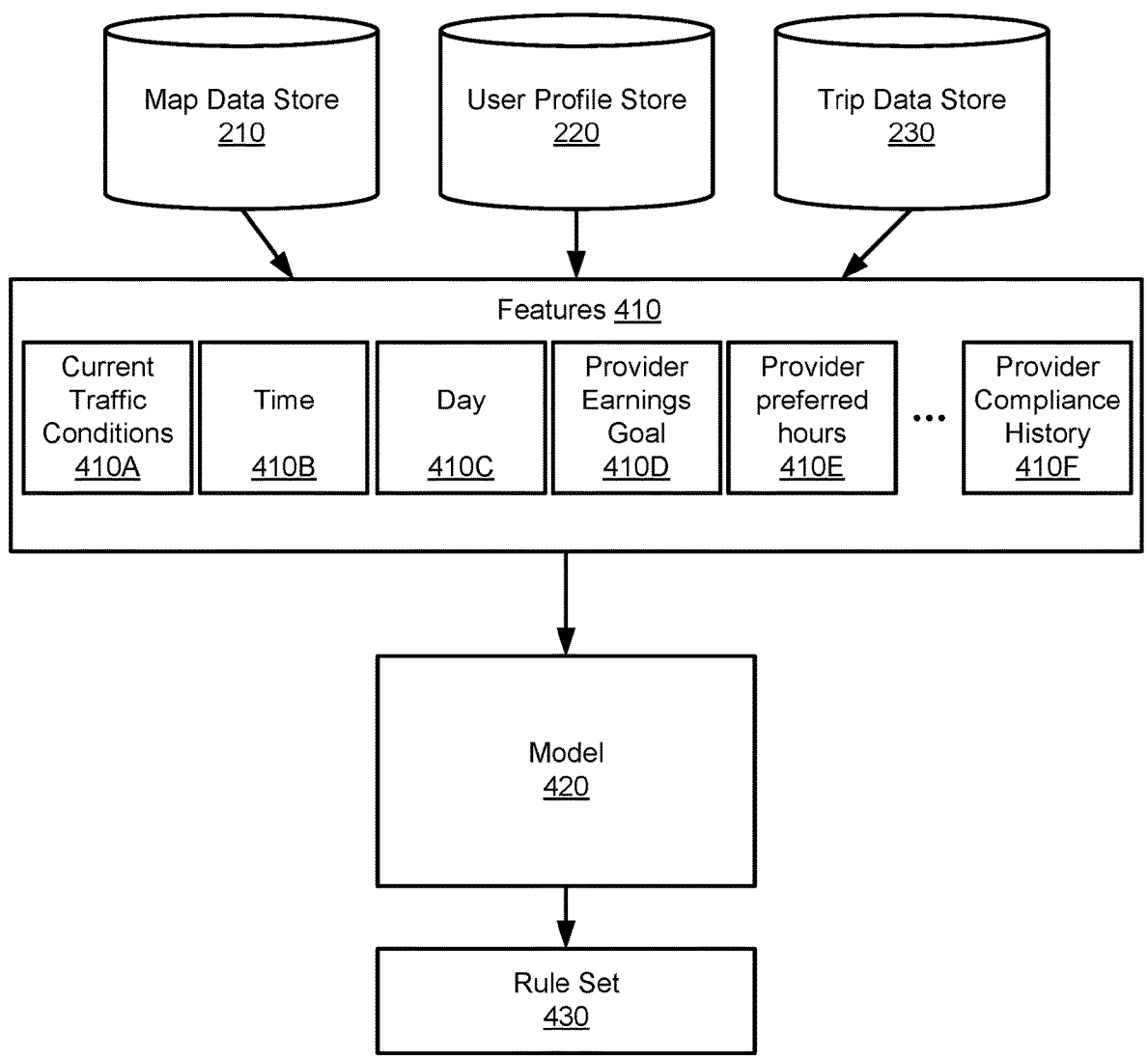
FIG. 4 is a data flow diagram depicting a process for using a model to determine a rule set, according to an embodiment.

FIG. 4 is a data flow diagram depicting a process for using a model to determine a rule set, according to an embodiment. The checkpoint generation module 260 obtains features from the map data store 210, the user profile store 220, and the trip data store 230. The features 410 may include current data and historical data. Some example features 410 that may be used as input to a model include current traffic conditions 410A, time 410B, day of the week 410C, a provider earnings goal 410D (e.g., how much compensation a provider wants to earn in a current week), preferred provider hours 410E, and a provider's history of compliance 410F (e.g., whether the provider tends to follow suggested routes and pass checkpoints). Additional examples of features not depicted in FIG. 4 include whether a provider is new or experienced, and the geography of the road segments near the provider. In some embodiments provider category may be included explicitly in a feature set (rather than being inferred from user profile information). The features 410 are provided as input to a selected model 420 which outputs a rule set 430 that can be applied to a route to determine the placement and value of checkpoints along the route.

Figure 5:
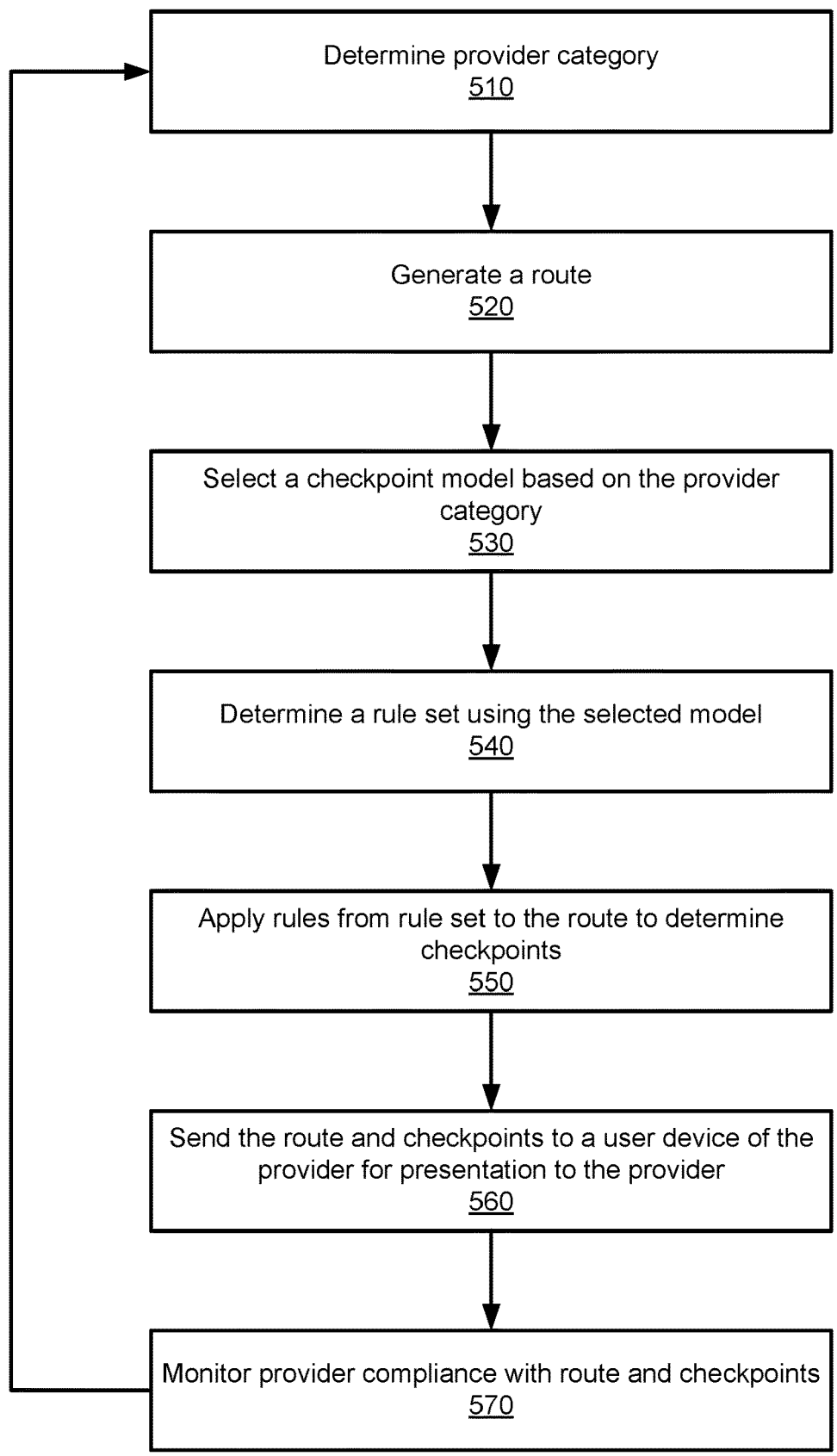
FIG. 5 is a flowchart illustrating a process for determining checkpoints along a route with which a provider is likely to comply, in accordance with an embodiment.

FIG. 5 is a flowchart illustrating a process for determining checkpoints along a route with which a provider is likely to comply, in accordance with an embodiment. The system 130 determines 510 a category of the provider and generates 520 a route. In some embodiments, the route is from a current location of the provider to a destination location, such as a location determined by the system 130 to need more providers. The system selects 530 a model from the checkpoint model store 240. The model may be selected according to the category of the provider.

The system 130 uses the model to determine 540 a rule set for placing checkpoints along a route and assigning values to the checkpoints. The rules of the rule set are applied 550 to the generated route to determine a number of checkpoints, placement of the checkpoints along the route, and values or rewards associated with the checkpoints. The system sends 560 information about the route and the checkpoints to a user device 100 of the provider. The user device 100 can display the route and the checkpoints as a suggestion that the provider move in the direction specified by the route. The provider's compliance (e.g., whether the provider follows the checkpoints) is monitored 570 by the trip monitoring module 270. Monitoring compliance may include detecting whether the provider follows the suggested route, and keeping a record of the checkpoints passed by the provider. Records of provider compliance may be used as future training data to improve the models. In some embodiments, the process iterates. Thus, future routes and corresponding checkpoints may be developed using the improved models.

Figure 6:
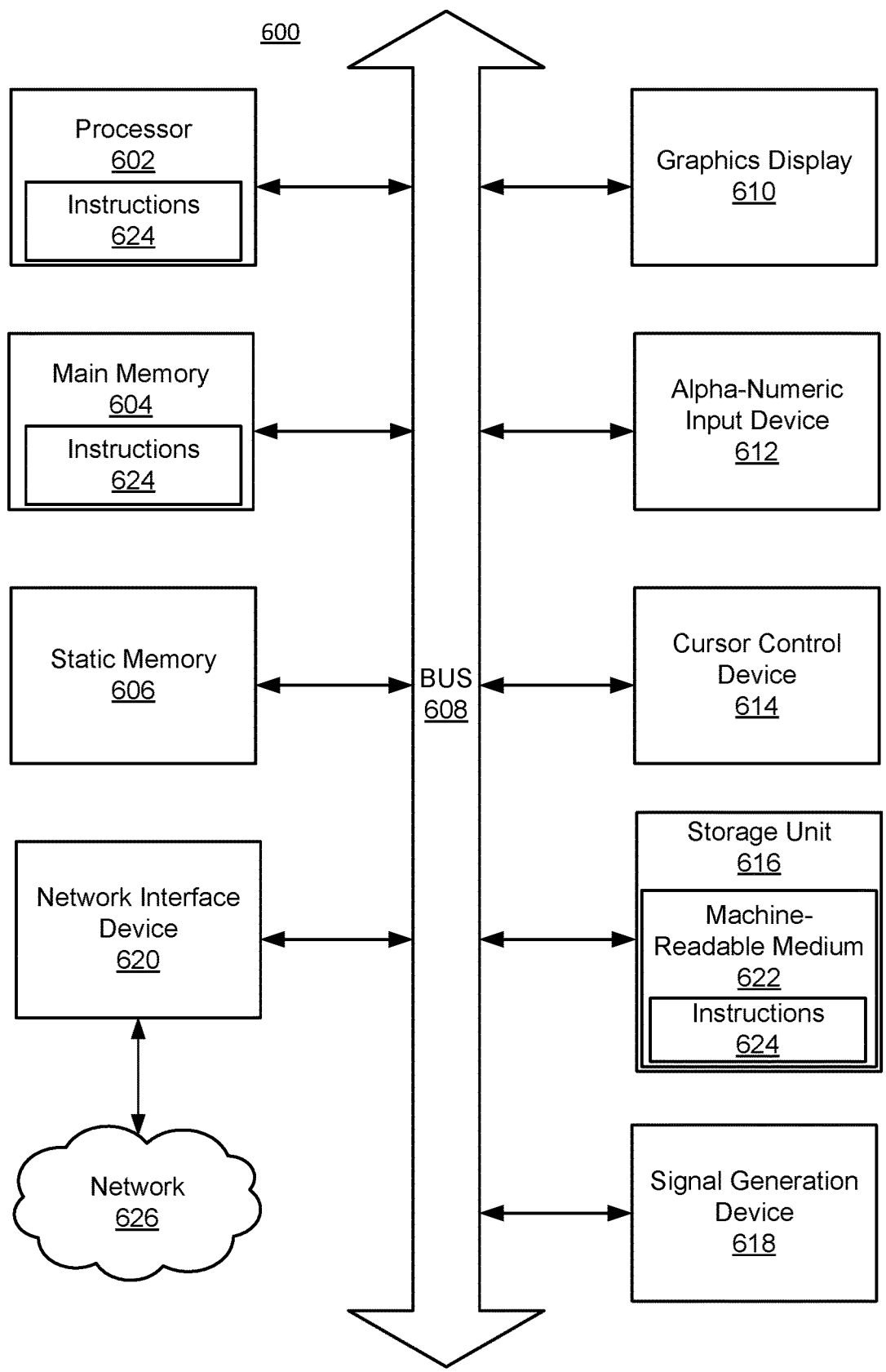
FIG. 6 is a block diagram illustrating components of an example machine able to read instructions from a machine-readable medium and execute them in one or more processors.

FIG. 6 is a block diagram illustrating components of an example machine able to read instructions from a machine-readable medium and execute them in one or more processors (or controllers). Specifically, FIG. 6 shows a diagrammatic representation of system 130 in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604, and the storage unit 616 communicate via a bus 608.

In addition, the computer system 606 can include a static memory 606, a graphics display 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. For example, the instructions 624 may include instructions for implementing the functionalities of the model generator 250, the checkpoint generation module 260, and/or the trip monitoring module 270. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626, such as the network 120, via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. For instance, a computing device coupled to a data storage device storing the computer program can correspond to a special-purpose computing device. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
   identifying a route from a user's current location to a destination location;
   determining a categorization of the user, based on user profile data of the user;
   selecting a model that is trained to generate rule sets for the determined categorization of the user from a plurality of models, the selected model configured to produce a rule set for determining a plurality of checkpoints for the user along the route;
   determining a rule set using the selected model, the rule set comprising instructions for spacing checkpoints spatially and temporally along the route, wherein the determination of the rule set using the selected model comprises:
      determining, for each of a plurality of rule sets, a likelihood that a user in the determined categorization of user will comply with checkpoints generated using the rule set; and
      selecting the rule set from the plurality of rule sets for which a user in the determined categorization of user has a highest determined likelihood of complying with checkpoints generated using the rule set;
   applying the rule set to the generated route to determine the plurality of checkpoints for the user, each checkpoint having a location along the route;
   sending the plurality of checkpoints to a user device of the user for presentation to the user; and
   monitoring user compliance with respect to the checkpoints.

2. The computer-implemented method of claim 1, further comprising:
   detecting another location of the user device that is not along the route;
   identifying a new route from the other location to the destination;
   applying the rule set to the new route to determine a plurality of new checkpoints for the user along the new route;
   sending the plurality of new checkpoints to the user device for presentation to the user; and
   monitoring user compliance with respect to the new checkpoints.

3. The computer-implemented method of claim 1, wherein determining a plurality of checkpoints along the route comprises selecting locations along the route and determining a reward associated with each selected location, a reward to be provided to a user subsequent to the user device of the user arriving at the location of an associated checkpoint.

4. The computer-implemented method of claim 1, wherein monitoring user compliance with respect to the checkpoints comprises detecting when a user device of the user passes checkpoints, and recording a number of checkpoints the user passes.

5. The computer-implemented method of claim 4, further comprising:
   re-training one or more models using data collected from monitoring the user compliance as training data.

6. The computer-implemented method of claim 1, wherein a destination location is a location in a region where fewer users that can provide a service are located than a number of users requesting the service.

7. A non-transitory computer-readable storage medium storing computer program instructions executable by one or more processors of a system to perform steps comprising:
   identifying a route from a user's current location to a destination location;
   determining a categorization of the user, based on user profile data of the user;
   selecting a model that is trained to generate rule sets for the determined categorization of the user from a plurality of models, the selected model configured to produce a rule set for determining a plurality of checkpoints along the route;
   determining a rule set using the selected model, the rule set comprising instructions for spacing check points spatially and temporally along the route, wherein the determination of the rule set using the selected model comprises:
      determining, for each of a plurality of rule sets, a likelihood that a user in the determined categorization of user will comply with checkpoints generated using the rule set; and
      selecting the rule set from the plurality of rule sets for which a user in the determined categorization of user has a highest determined likelihood of complying with checkpoints generated using the rule set;
   applying the rule set to the generated route to determine the plurality of checkpoints for the user, each checkpoint having a location along the route;
   sending the plurality of checkpoints to a user device of the user for presentation to the user; and
   monitoring user compliance with respect to the checkpoints.

8. The non-transitory computer-readable storage medium of claim 7, further comprising:
   detecting another location of the user device that is not along the route;
   identifying a new route from the other location to the destination;
   applying the rule set to the new route to determine a plurality of new checkpoints for the user along the new route;
   sending the plurality of new checkpoints to the user device for presentation to the user; and
   monitoring user compliance with respect to the new checkpoints.

9. The non-transitory computer-readable storage medium of claim 7, wherein determining a plurality of checkpoints along the route comprises selecting locations along the route and determining a reward associated with each selected location, a reward to be provided to a user subsequent to the user device of the user arriving at the location of an associated checkpoint.

10. The non-transitory computer-readable storage medium of claim 7, wherein monitoring user compliance with respect to the checkpoints comprises detecting when a user device of the user passes checkpoints, and recording a number of checkpoints the user passes.

11. The non-transitory computer-readable storage medium of claim 10, further comprising:
re-training one or more models using data collected from monitoring the user compliance as training data.

12. The non-transitory computer-readable storage medium of claim 7, wherein a destination location is a location in a region where fewer users that can provide a service are located than a number of users requesting the service.

13. A computer system comprising:
one or more computer processors for executing computer program instructions; and a non-transitory computer-readable storage medium storing instructions executable by the one or more computer processors to perform steps comprising:
identifying a route from a user's current location to a destination location;
determining a categorization of the user, based on user profile data of the user;
selecting a model that is trained to generate rule sets for the determined categorization of the user from a plurality of models, the selected model configured to produce a rule set for determining a plurality of checkpoints along the route;
determining a rule set using the selected model, the rule set comprising instructions for spacing checkpoints spatially and temporally along the route, wherein the determination of the rule set using the selected model comprises:
determining, for each of a plurality of rule sets, a likelihood that a user in the determined categorization of user will comply with checkpoints generated using the rule set; and
selecting the rule set from the plurality of rule sets for which a user in the determined categorization of user has a highest determined likelihood of complying with checkpoints generated using the rule set;
applying the rule set to the generated route to determine the plurality of checkpoints for the user, each checkpoint having a location along the route;
sending the plurality of checkpoints to a user device of the user for presentation to the user; and
monitoring user compliance with respect to the checkpoints.

14. The computer system of claim 13, further comprising:
detecting another location of the user device that is not along the route;
identifying a new route from the other location to the destination;
applying the rule set to the new route to determine a plurality of new checkpoints for the user along the new route;
sending the plurality of new checkpoints to the user device for presentation to the user; and
monitoring user compliance with respect to the new checkpoints.

15. The computer system of claim 13, wherein determining a plurality of checkpoints along the route comprises selecting locations along the route and determining a reward associated with each selected location, a reward to be provided to a user subsequent to the user device of the user arriving at the location of an associated checkpoint.

16. The computer system of claim 13, wherein monitoring user compliance with respect to the checkpoints comprises detecting when a user device of the user passes checkpoints, and recording a number of checkpoints the user passes.

17. The computer system of claim 16, further comprising:
re-training one or more models using data collected from monitoring the user compliance as training data.

\* \* \* \* \*